United States Patent [19]
Hamada et al.

[11] Patent Number: 5,751,442
[45] Date of Patent: May 12, 1998

[54] COMMUNICATION CONNECTION APPARATUS FOR USE IN DIRECT CONNECTION BETWEEN FACSIMILE MODEM APPARATUS AND FACSIMILE APPARATUS

[75] Inventors: Kiyoshi Hamada; Shin-ichi Ishimoto. both of Tokyo, Japan

[73] Assignee: Mitsubishi Denki Kabushiki Kaisha. Tokyo, Japan

[21] Appl. No.: 641,549

[22] Filed: May 1, 1996

[30] Foreign Application Priority Data

Oct. 18, 1995 [JP] Japan ................... 7-270129

[51] Int. Cl.$^6$ .................. H04M 11/00; H04M 1/40; H04M 1/32; G06F 13/40
[52] U.S. Cl. ................ 358/442; 379/100; 358/443
[58] Field of Search ................ 358/400, 406, 358/407, 410, 442, 434, 443, 448, 468; 379/100, 100.12; 364/919.1; 455/557

[56] References Cited

U.S. PATENT DOCUMENTS

| | | | |
|---|---|---|---|
| 4,609,863 | 9/1986 | Asai et al. | 323/223 |
| 4,964,154 | 10/1990 | Shimotono | 379/100 |
| 4,991,200 | 2/1991 | Lin | 379/100 |
| 5,166,977 | 11/1992 | Ross | 379/100 |
| 5,530,558 | 6/1996 | Nachman | 358/468 |

FOREIGN PATENT DOCUMENTS

| | | |
|---|---|---|
| 250895 | 2/1990 | Japan. |
| 4259050 | 9/1992 | Japan. |
| 4126453 | 11/1992 | Japan. |
| 670083 | 3/1994 | Japan. |

*Primary Examiner*—Edward L. Coles, Sr.
*Assistant Examiner*—Kimberly A. Williams

[57] ABSTRACT

A communication connection apparatus connected between a facsimile modem apparatus and a facsimile apparatus is provided for connecting the facsimile modem apparatus with the facsimile apparatus through a pair of transmission lines so as to execute communication between the facsimile modem apparatus and the facsimile apparatus. Further, a DC power source applies to a pair of transmission lines through a resistor, a predetermined DC voltage for transmitting an analog facsimile signal transmitted from either one of the facsimile modem apparatus and the facsimile apparatus so as to superimpose the analog facsimile signal on the DC voltage through a pair of transmission lines. In the communication connection apparatus, there is preferably further provided a diode connected between the DC power source and the resistor in a direction of a polarity of the diode such that the predetermined DC voltage is applied to a pair of transmission lines. A facsimile modem apparatus may include the communication connection apparatus.

10 Claims, 13 Drawing Sheets

DC Loop Circuit 25

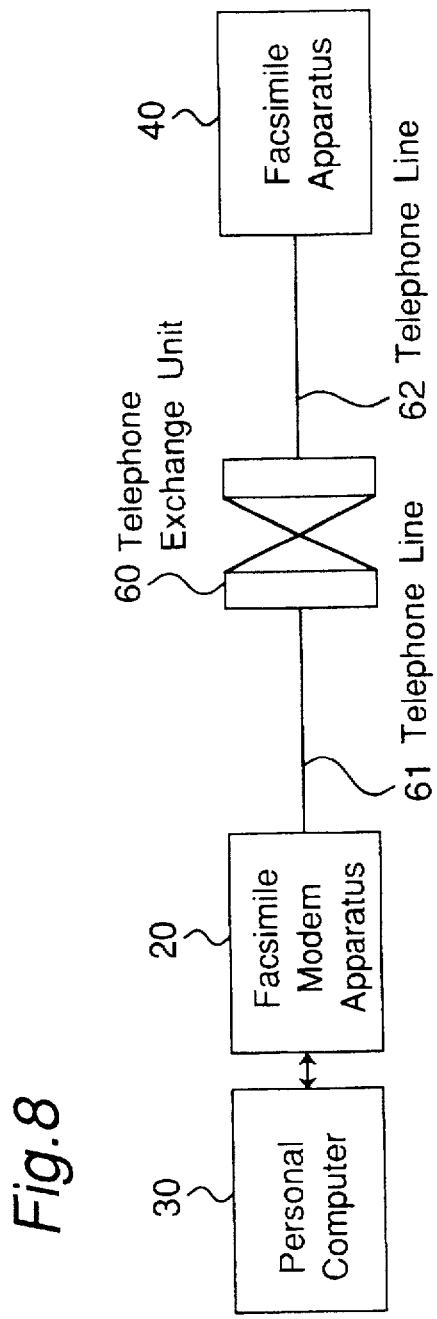

COMMUNICATION CONNECTION APPARATUS FOR USE IN DIRECT CONNECTION BETWEEN FACSIMILE MODEM APPARATUS AND FACSIMILE APPARATUS

BACKGROUND OF THE INVENTION

1. Field of the Invention

The present invention relates to a communication connection apparatus for use in a direct connection between a facsimile modem apparatus and a facsimile apparatus, and to a facsimile modem apparatus comprising the communication connection apparatus, in particular, to a communication connection apparatus for executing communication by directly connecting a facsimile modem apparatus with a facsimile apparatus by way of a pair of transmission lines without any interposition such as a telephone line or the like, and to a facsimile modem apparatus comprising the communication connection apparatus.

2. Description of the Prior Art

FIG. 8 is a block diagram of an example of a first prior art communication system for connecting a facsimile modem apparatus 20 with a facsimile apparatus 40 so as to execute communication between them.

Referring to FIG. 8, the facsimile modem apparatus 20 has both of a data modem function for executing communication with a modem apparatus having a data modem function, and a facsimile modem function for executing communication with a facsimile apparatus or a modem apparatus having a facsimile modem function. Hereinafter, in the present specification, the facsimile modem apparatus 20 is referred to as a modem apparatus having the data modem function and the facsimile modem function. The modem (MODEM) apparatus is defined as a modulator/demodulator including a modulator and a demodulator for transmitting and receiving a variety of data by way of a predetermined communication line.

The facsimile modem apparatus 20 is connected to a personal computer 30 through, for example, an RS-232C interface. When the facsimile modem apparatus 20 performs an originating or calling-out process, the facsimile modem apparatus 20 is connected to the facsimile apparatus 40 by way of a telephone line 61 of a public switched telephone network (PSTN), a telephone exchange unit 60 and a telephone line 62. When the facsimile apparatus 40 performs an originating process, the facsimile apparatus 40 is connected to the facsimile modem apparatus 20 by way of the telephone line 62 of the public switched telephone network, the telephone exchange unit 60 and the telephone line 61.

In the first prior art communication system constructed as above, the facsimile modem apparatus 20 and the facsimile apparatus 40 are connected with each other by way of the public switched telephone network, and then, image data can be transmitted by facsimile communication according to a predetermined communication protocol of facsimile communication in a manner as described above.

The first prior art shows a communication system for a general facsimile communication, and the communication system of the first prior art has been required to execute communication surely by way of the telephone exchange unit 60 of the public switched telephone network. This means that no communication has been able to be executed by directly connecting a facsimile modem apparatus 102 with a facsimile apparatus without any interposition of the telephone exchange unit 60. In order to solve the above-mentioned problem, in the Japanese Patent Laid-Open Publication No. 4-259050, there is disclosed a direct transmission system for enabling use of a facsimile apparatus 105 as a printer for a personal computer 101, wherein information which the personal computer 101 (referred to as personal computer information hereinafter) has is directly transmitted to the facsimile apparatus 105. FIG. 9 shows a communication system utilizing the above-mentioned direct transmission system.

A currently implemented personal computer communication is generally executed by means of a telephone line of the public switched telephone network as shown in the first prior art. Therefore, a telephone exchange unit is interposed between the personal computer 101 and a personal computer or the facsimile apparatus 105, and data communication is executed using an analog signal. However, if data of the personal computer information is tried to be transmitted directly from the personal computer 101 to the facsimile apparatus 105, since no telephone exchange unit is interposed between them, the facsimile apparatus 105 cannot be operated due to the unique construction of the facsimile apparatus 105. Therefore, in a second prior art, as shown in FIG. 9, an adapter 107 is provided with a function substituting for the telephone exchange unit, so that the facsimile apparatus 105 can be used as a printer.

In the communication system shown in FIG. 9, when the respective apparatuses 101, 102 and 105 are firstly turned on so that the electric powers are supplied thereto and a function key of the personal computer 101 is pressed to transmit an instruction command AT, then a rectangular wave signal generator 121 of the facsimile modem apparatus 102 is activated, and, for example, a rectangular wave signal as shown in FIG. 7A is transmitted to a base of a transistor 122. At that time, when the transistor 122 is turned on, a 5-V DC power source of the facsimile modem apparatus 102 is connected to the ground or earth of the facsimile modem apparatus 102 through a relay RL1, the ground of the adapter 107 and the transistor 122, so that a closed circuit is formed to flow a current through the relay RL1 for one second. At that time, the relay RL1 is operated to switch two changeover switches 171a and 171b to respective contact points "b" thereof. By this operation, a pair of transmission lines L1 and L2 is put in an OFF-state, while a pair of output side transmission lines L1' and L2' of the adapter 107 is connected to the transistor 122 and an ON/OFF switching circuit 175 of a frequency modulator circuit 173. When the changeover switches 171a and 171b are thus switched to the contact points "b" thereof, the rectangular wave signal is supplied from a rectangular wave signal generator 121 to the ON/OFF switching circuit 175 through the transistor 122, and then, the rectangular wave signal is then modulated by the frequency modulator circuit 173, so that a 16-Hz pseudo-ringing signal as shown in FIG. 7A is sent to the transmission lines L1' and L2'.

When the facsimile apparatus 105 receives the pseudo-ringing signal, a 16-Hz detector 151 detects the pseudo-ringing signal and turns on a switch 152. When the switch 152 is turned on so as to be closed, a 600-Ω transformer (not shown) provided in the facsimile apparatus 105 is connected to the transmission lines L1' and L2', and this leads to an increased load. Consequently, a current limiter circuit of a DC/DC converter 172 operates, and an output voltage is lowered from 200 V to 5 V. Therefore, the frequency modulator circuit 173 almost stops its operation so as to protect an excessive input signal to the facsimile apparatus 105. Then, after a predetermined time T1, the changeover switches 171a and 171b are switched to their contact points "a", and an answer tone is inputted from the facsimile apparatus 105 to the facsimile modem apparatus 102 within a predetermined time interval T2. When an answer-tone confirmation circuit 123 detects the answer tone, the answer-tone confirmation circuit 123 transmits a stop signal to the rectangular wave signal generator 121, so that the operation of the signal generator 121 is stopped. For the above-mentioned time interval, when the personal computer 101 receives the answer tone, then the personal computer 101 transmits the data of the personal computer information to the facsimile apparatus 105 according to a previously set communication protocol in a manner similar to that of the personal computer communication, so that the facsimile apparatus 105 prints out the data of personal computer information onto a sheet of paper.

According to the first prior art, when communication is executed by connecting the facsimile modem apparatus with the facsimile apparatus, the communication is required to be executed by connecting both the apparatuses to the telephone line of the public switched telephone network. Therefore, when a portable terminal apparatus such as a notebook type personal computer or the like is used at a site of destination and also the site is not equipped with a printer which can be operatively connected to the portable terminal apparatus, the following procedure is required. That is, by connecting the portable terminal apparatus to a telephone line of the public switched telephone network through a facsimile modem apparatus and performing a originating process to the facsimile apparatus equipped in an office at the site of destination, an image data will be transmitted from the portable terminal apparatus to the facsimile modem apparatus. In this case, there is such a problem that a communication fee for the telephone line must be paid.

Furthermore, the second prior art has been accompanied by the following problems.

(a) Each of facsimile modem apparatuses generally sold on the market is of two-wire type. Such a two-wire type facsimile modem apparatus is provided neither with a terminal TE1 for use in supplying the 5-V DC power source nor with a terminal TE6 to be connected to the transistor 122, and is provided neither with the rectangular wave signal generator 121 nor with the transistor 122. Therefore, the facsimile modem apparatus 102 becomes an article or product specially made to order, and such a product will be expensive.

(b) In regard to a normal telephone line of the public switched telephone network, a DC voltage of −48 V for transmitting an analog telephone signal is applied from the telephone exchange unit 60 to a pair of transmission lines so as to superimpose the analog telephone signal on the DC voltage. However, in the adapter 107, no DC voltage is applied to the transmission lines L1 and L2, and L1' and L2'. Assuming that the voltage across the transmission lines is 0 V, a facsimile signal having a level of about 15 dBm is absorbed and attenuated by DC resistances of both of the facsimile modem apparatus 102 and a network control unit (NCU) circuit of the facsimile apparatus 105. Therefore, it can be considered that the facsimile signal cannot be transmitted between the facsimile modem apparatus 102 and the facsimile apparatus 105.

SUMMARY OF THE INVENTION

An essential object of the present invention is therefore to provide a communication connection apparatus capable of connecting with each other directly by way of a pair of transmission lines without any interposition of a telephone line, a modem apparatus and a facsimile apparatus, which are generally sold on the market, thereby executing communication between them.

Another object of the present invention is to provide an inexpensive communication connection apparatus having a structure simpler than that of the prior art apparatus.

A further object of the present invention is to provide a facsimile modem apparatus comprising a communication connection apparatus capable of connecting with each other directly by way of a pair of transmission lines without any interposition of a telephone line, a modem apparatus and a facsimile apparatus, which are generally sold on the market, thereby executing communication between them.

A still further object of the present invention is to provide a facsimile modem apparatus comprising an inexpensive communication connection apparatus having a structure simpler than that of the prior art apparatus.

In order to achieve the above-mentioned objective, according to one aspect of the present invention, a communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, comprising:

DC power source means for applying to said pair of transmission lines through a resistor, a predetermined DC voltage for transmitting an analog facsimile signal transmitted from either one of said facsimile modem apparatus and said facsimile apparatus so as to superimpose the analog facsimile signal on the DC voltage by way of said pair of transmission lines.

The above-mentioned communication connection apparatus preferably further comprises:

diode means operatively connected between said DC power source means and said resistor in a direction of a polarity of said diode means of said diode means such that said predetermined DC voltage is applied to said pair of transmission lines.

The above-mentioned communication connection apparatus preferably further comprises:

switch means having either one of an ON-state and an OFF-state, operatively connected between one transmission line of said pair of transmission lines, and said resistor, said switch means being normally or previously put in an ON-state thereof; and voltage detecting means for detecting a voltage generated across said pair of transmission lines and controlling said switch means to be switched over from the ON-state to an OFF-state thereof when the detected voltage is higher than a predetermined threshold voltage higher than said predetermined DC voltage.

According to another aspect of the present invention, there is provided a communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, comprising:

a capacitor operatively inserted in one of said pair of transmission lines, said capacitor interrupting a DC current and allowing an analog facsimile signal transmitted from either one of said facsimile modem apparatus and said facsimile apparatus to be passed therethrough; and DC power source means for applying through a first resistor to one end of said capacitor operatively connected to said facsimile modem apparatus, a predetermined DC voltage for transmitting said analog facsimile signal so as to superimpose the analog facsimile signal on the DC voltage by way of said pair of transmission lines and for applying said predetermined DC voltage through a diode means and a second resistor to another end of said capacitor operatively connected to said facsimile apparatus.

The above-mentioned communication connection apparatus preferably further comprises:

signal generating means for generating a pseudo ringing signal of a telephone line; and further voltage detecting means for detecting a voltage generated across both the ends of said capacitor, controlling so that said pseudo ringing signal is transmitted from said signal generating means to said facsimile modem apparatus when a voltage of one end of said capacitor is higher than a voltage of another end of said capacitor, and controlling that said pseudo ringing signal is transmitted from said signal generating means to said facsimile apparatus when the voltage of one end of said capacitor is lower than the voltage of another end of said capacitor.

According to a further aspect of the present invention, there is provided a facsimile modem apparatus comprising a communication connection apparatus, operatively connected between said facsimile modem apparatus and a facsimile apparatus, for connecting said facsimile modem apparatus with said facsimile apparatus by way of a pair of transmission lines so as to execute communication between said facsimile modem apparatus and said facsimile apparatus, said communication connection apparatus comprising:

DC power source means for applying to said pair of transmission lines through a resistor, a predetermined DC voltage for transmitting an analog facsimile signal transmitted from either one of said facsimile modem apparatus and said facsimile apparatus so as to superimpose the analog facsimile signal on the DC voltage by way of said pair of transmission lines.

In the above-mentioned facsimile modem apparatus, is said communication connection apparatus preferably further comprises:

diode means operatively connected between said DC power source means and said resistor in a direction of a polarity of said diode means of said diode means such that said predetermined DC voltage is applied to said pair of transmission lines.

In the above-mentioned facsimile modem apparatus, said communication connection apparatus preferably further comprises:

switch means having either one of an ON-state and an OFF-state, operatively connected between one transmission line of said pair of transmission lines, and said resistor, said switch means being normally or previously put in an ON-state thereof; and voltage detecting means for detecting a voltage generated across said pair of transmission lines and controlling said switch means to be switched over from the ON-state to an OFF-state thereof when the detected voltage is higher than a predetermined threshold voltage higher than said predetermined DC voltage.

According to a still further aspect of the present invention, there is provided a facsimile modem apparatus comprising a communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, said communication connection apparatus comprising:

a capacitor operatively inserted in one of said pair of transmission lines, said capacitor interrupting a DC current and allowing an analog facsimile signal transmitted from either one of said facsimile modem apparatus and said facsimile apparatus to be passed therethrough; and DC power source means for applying through a first resistor to one end of said capacitor operatively connected to said facsimile modem apparatus, a predetermined DC voltage for transmitting said analog facsimile signal so as to superimpose the analog facsimile signal on the DC voltage by way of said pair of transmission lines and for applying said predetermined DC voltage through a diode means and a second resistor to another end of said capacitor operatively connected to said facsimile apparatus.

In the above-mentioned facsimile modem apparatus, said communication connection apparatus preferably further comprises:

signal generating means for generating a pseudo ringing signal of a telephone line; and further voltage detecting means for detecting a voltage generated across both the ends of said capacitor, controlling so that said pseudo ringing signal is transmitted from said signal generating means to said facsimile modem apparatus when a voltage of one end of said capacitor is higher than a voltage of another end of said capacitor, and controlling that said pseudo ringing signal is transmitted from said signal generating means to said facsimile apparatus when the voltage of one end of said capacitor is lower than the voltage of another end of said capacitor.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 8 is a block diagram of an example of a first prior art communication system;

DETAILED DESCRIPTION OF THE PREFERRED EMBODIMENTS

Preferred embodiments of the present invention will be described below with reference to the accompanying drawings.

First Preferred Embodiment

Figure 1:
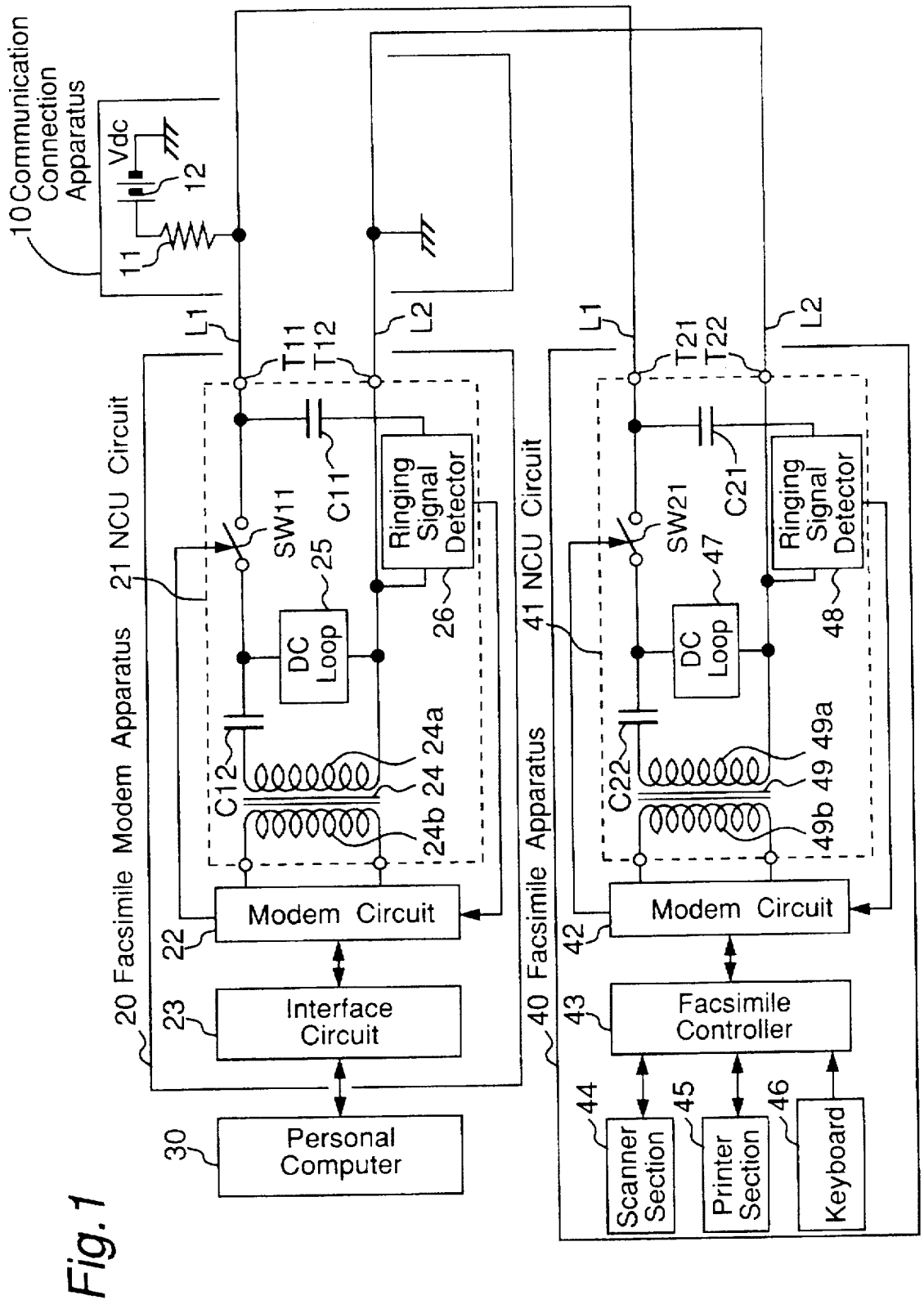
FIG. 1 is a block diagram of a communication system including a communication connection apparatus 10 according to a first preferred embodiment of the present invention.

FIG. 1 is a block diagram of a communication system including a communication connection apparatus 10 according to a first preferred embodiment of the present invention, and in FIG. 1, the same components as those shown in FIG. 8 are denoted by the same reference numerals shown in FIG. 8.

Referring to FIG. 1, the communication connection apparatus 10 of the first preferred embodiment is a communication connection apparatus which is connected between a facsimile modem apparatus 20 and a facsimile apparatus 40, and which is provided for executing communication by connecting the facsimile modem apparatus 20 with the facsimile apparatus 40 through a pair of two-wire type transmission lines L1 and L2. The present communication connection apparatus 10 is characterized in comprising a DC power source 12 for applying a predetermined DC voltage Vdc to a pair of transmission lines L1 and L2 through a resistor 11, wherein the DC voltage Vdc is provided for transmitting an analog facsimile signal transmitted from the facsimile modem apparatus 20 or the facsimile apparatus 40 so as to superimpose the analog facsimile signal thereon by way of a pair of transmission lines L1 and L2.

In the communication connection apparatus 10, as shown in FIG. 1, a positive electrode of the DC power source 12 which is, for example, a battery or a constant-voltage regulated DC power supply such as a switching regulator or the like is connected to the transmission line L1, preferably, through the resistor 11 having a resistance value of 50 Ω to 100 Ω, while a negative electrode of the DC power source 12 is grounded. On the other hand, the transmission line L2 is grounded.

In the preferred embodiment, the DC voltage of the DC power source 12 is +5 V. Further, the DC voltage may be a negative DC voltage in a range of −50 V to −2 V, or a positive DC voltage in a range of +2 V to +50 V.

The facsimile modem apparatus 20 comprises a network control unit circuit (referred to as an NCU circuit hereinafter) 21, a modem circuit 22 and an interface circuit 23. The interface circuit 23 is an interface for executing an interface process such as a signal conversion or the like between a personal computer 30 for controlling the facsimile modem apparatus 20 and the modem circuit 22. The interface circuit 23 receives from the facsimile modem apparatus 20, control data for controlling the modem circuit 22 such as an AT command or the like. Further, after receiving a signal data to be transmitted from the personal computer, the interface circuit 23 outputs the received data to the modem circuit 22. The interface circuit 23 also outputs to the personal computer 30, the signal data received by the modem circuit 22 and a response data generated by the modem circuit 22 in response to the above-mentioned control data.

The modem circuit 22 is a modulator/demodulator circuit having both of a data modem function and a facsimile modem function, and is provided in a form of an IC (Integrated Circuit). The modem circuit 22 executes a control setting process in the modem circuit 22 in response to the control data inputted from the personal computer 30 through the interface circuit 23, and then, outputs to the personal computer 30 through the interface circuit 23, both of the response data and control data corresponding to a communication line control signal from the NCU circuit 21, such as a ringing signal (or calling signal) of the telephone line. Further, the modem circuit 22 modulates a carrier wave signal according to the signal data inputted from the personal computer 30 through the interface circuit 23, using a digital modulation method such as FSK (Frequency Shift Keying), PSK (Phase Shift Keying), QAM (Quadrature Amplitude Modulation) or the like, so as to generate a modulated signal, and then, transmits the modulated signal to the facsimile apparatus 40 by way of the NCU circuit 21 and the transmission lines L1 and L2. On the other hand, after the modem circuit 22 demodulates the modulated signal received from the facsimile apparatus 40 by way of the transmission lines L1 and L2 and the NCU circuit 21 so as to generate an original demodulated signal data, the modem circuit 22 outputs the demodulated signal to the personal computer 30 through the interface circuit 23. Further, upon receiving an originating or calling-out command data (e.g., "ATD" of AT command) or an incoming command data (e.g., "ATA" of AT command) from the personal computer 30, the modem circuit 22 controls a switch SW11 of the NCU circuit 21 to be switched over from an OFF-state into an ON-state thereof.

In the NCU circuit 21, the transmission line L1 is connected to a terminal T11. The terminal T11 is normally or previously put in an OFF-state thereof and is connected to one end of a primary coil 24a of a transformer 24 through both of the switch SW11 which is a hook switch controlled by the modem circuit 22 and a capacitor C12 for interrupting a DC current but allowing an analog facsimile signal to be passed therethrough. On the other hand, the transmission line L2 is connected to a terminal T12, and the terminal T12 is connected to another end of the primary coil of the transformer 24. Between the terminal T11 and the terminal T12 is inserted so as to be connected a series circuit composed of both of a capacitor C11 for interrupting a DC current but allowing the ringing signal to be passed therethrough and a ringing signal detector 26. Upon detecting the ringing signal across the terminal T11 and the terminal T12, the ringing signal detector 26 outputs a detection signal to the modem circuit 22.

Further, a DC (Direct Current) loop circuit 25 is inserted so as to be connected between a connecting point of the switch SW11 and the capacitor C12 and the terminal T12.

Figure 6:
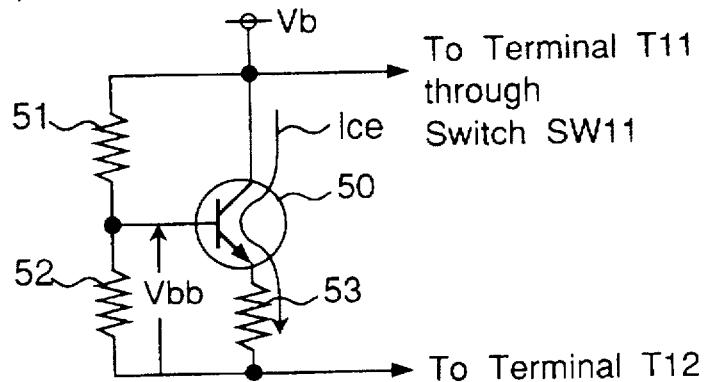
FIG. 6 is a circuit diagram of a DC loop circuit 25 shown in FIG. 1.

FIG. 6 shows a preferred embodiment of the DC loop circuit 25. Referring to FIG. 6, a predetermined base bias voltage Vbb obtained by dividing a DC bias voltage Vb by a resistor 51 and a resistor 52 is applied to a base of an NPN type transistor 50. A collector of the transistor 50 is connected to a voltage source of the DC bias voltage Vb and is connected to the terminal T11 through the switch SW11. An emitter of the transistor 50 is grounded through a resistor 53 and is connected to the terminal T12.

In the DC loop circuit 25 constructed as above, a collector-emitter current Ice between the collector and the emitter can be changed by changing the base bias voltage Vbb. In the preferred embodiment, respective circuit constant values of the DC loop circuit 25 are set so that a loop current through the transmission lines L1 and L2 flows within a range of 20 mA to 125 mA when a loop resistance value achieved when both of the switch SW11 and a switch SW21 are turned on is within a range of 50 $\Omega$ to 300 $\Omega$.

On the other hand, the facsimile apparatus 40 comprises an NCU circuit 41, a modem circuit 42, a facsimile controller 43, a scanner section 44, a printer section 45, and a keyboard 46. The NCU circuit 41 is constructed so as to be similar to the NCU circuit 21, and comprises terminals T21 and T22, capacitors C21 and C22, a switch SW21, a DC loop circuit 47, a ringing signal detector 48 and a transformer 49, wherein each of the respective components T21, T22, C21, C22, SW21, 47, 48 and 49 operates in a manner similar to that of each of the respective corresponding components of the NCU circuit 21.

The facsimile controller 43 controls the operations of the respective circuits of the facsimile apparatus 40. The facsimile controller 43 is connected to the following units:

(a) the scanner section 44 for reading an image to be transmitted, converting a read image into an image data and outputting the image data to the facsimile controller 43;

(b) the printer section 45 for printing out on a sheet of paper, an image corresponding to the image data from the facsimile controller 43 based on the image data; and (c) the keyboard 46 for inputting control command data of the facsimile apparatus 40.

The facsimile controller 43 is connected to the NCU circuit 41 through the modem circuit 42. For example, when an incoming command data is inputted using the keyboard 46, the facsimile controller 43 turns on the switch SW21 through the modem circuit 42 so as to close the switch SW12. After the facsimile signal received by the modem circuit 42 through the NCU circuit 41 is demodulated so as to be converted into a signal data of an image data, the signal data thereof is outputted to the printer section 45 through the facsimile controller 43, and then, the image of the image data is printed out onto a sheet of paper by the printer section 45.

In the communication system of the first preferred embodiment constructed as above, when communication is executed, the facsimile modem apparatus 20 is put in the originating state, while the facsimile apparatus 40 is put in the incoming state. That is, an originating command is inputted to the personal computer 30, using a keyboard (not shown) connected thereto, and in response to this, the personal computer 30 outputs the originating command to the modem circuit 22 through the interface circuit 23. In response to this, the modem circuit 22 controls the switch SW11 of the NCU circuit 21 to be switched over from the OFF-state to the ON-state thereof. On the other hand, when an incoming command is inputted using the keyboard 46, the facsimile controller 43 turns on the switch SW21 through the modem circuit 42 so as to close the switch SW21. At that time, a DC loop is formed through the DC loop circuit 25 of the NCU circuit 21, the transmission lines L1 and L2, and the DC loop circuit 47 of the NCU circuit 41.

Then, the personal computer 30 transmits a signal data of an image data to the modem circuit 22 through the interface circuit 23 according to the predetermined facsimile communication protocol. In response to this, the modem circuit 22 modulates the carrier wave signal according to the signal data, and transmits the modulated signal, which is the facsimile signal, to the modem circuit 42 through the NCU circuit 21, the transmission lines L1 and L2, and the NCU circuit 41 of the facsimile apparatus 40. At that time, the DC voltage Vdc is applied from the DC power source 12 to the transmission lines L1 and L2 through the resistor 11 which operates as a pull-up resistor. Therefore, the modulated signal of the facsimile signal can be transmitted by way of the transmission lines L1 and L2 so as to be superimposed on the DC voltage Vdc. Subsequently, the facsimile signal received by the modem circuit 42 is demodulated so as to be converted into a signal data which is an image data, and the signal data is outputted to the printer section 45 through the facsimile controller 43, then, an image of the image data is printed out onto a sheet of paper by the printer section 45.

In the communication connection apparatus 10 of the first preferred embodiment constructed as above, the predetermined DC voltage Vdc is applied from the DC power source 12 to a pair of transmission lines L1 and L2 through the resistor 11. With this arrangement, the facsimile signal can be transmitted so as to be superimposed on the DC voltage Vdc by way of a pair of transmission lines L1 and L2. The communication connection apparatus 10 has such an advantageous effect that the apparatus 10 has a very simple construction and can be manufactured at a cost lower than that of the prior art.

The NCU circuits 21 and 41 of the first preferred embodiment are provided with no selection signal generator circuit for selectively generating a dial pulse signal (DP signal) or a push-button signal (PB signal or DTMF (Dual Tone Multi-Frequency) signal). However, the present invention is not limited to this, and a selection signal generator circuit may be provided.

In the first preferred embodiment shown in FIG. 1, the positive DC voltage Vdc is applied to the transmission line L1. However, the present invention is not limited to this, and a negative DC voltage may be applied to the transmission line L1.

In the first preferred embodiment, the personal computer 30 is used, however, the present invention is not limited to this, and the personal computer 30 may be a controller such as a microcomputer, a host computer or the like.

Second Preferred Embodiment

Figure 2:
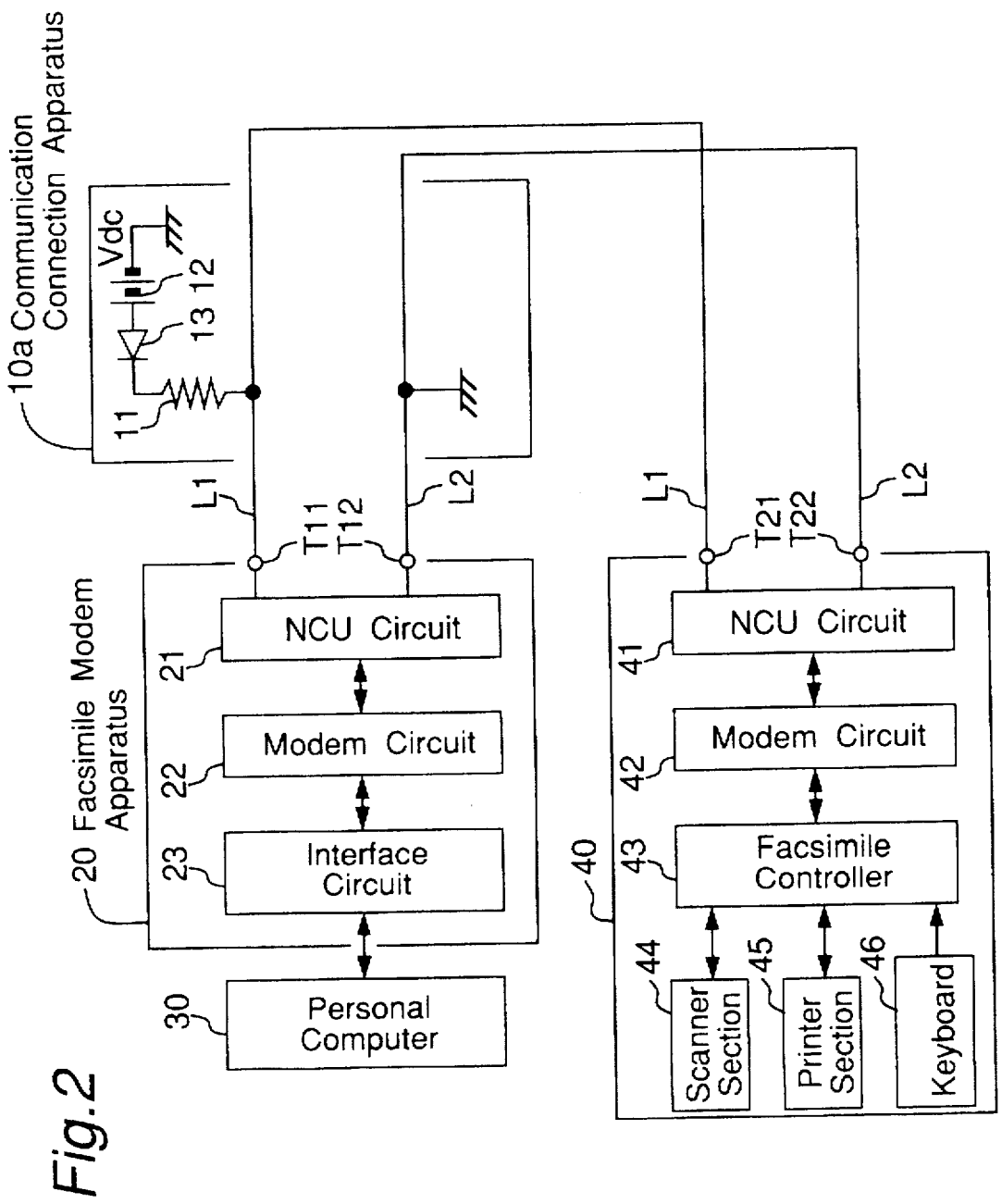
FIG. 2 is a block diagram of a communication system including a communication connection apparatus 10a according to a second preferred embodiment of the present invention.

FIG. 2 is a block diagram of a communication system including a communication connection apparatus 10a according to a second preferred embodiment of the present invention. In FIG. 2, the same components as those shown in FIG. 1 are denoted by the same reference numerals shown in FIG. 1.

As seen from comparison between the communication connection apparatuses 10 and 20 respectively shown in FIGS. 1 and 2, the communication connection apparatus 10a of the second preferred embodiment is characterized in that a diode 13 is further connected between the DC power source 12 and the resistor 11 in a direction of the polarity of the diode 13 such that the predetermined DC voltage Vdc is applied to a pair of transmission lines L1 and L2. The point of the present preferred embodiment different from the first preferred embodiment will be described in detail below.

Referring to FIG. 2, an anode of the diode 13 is connected to the positive electrode of the DC power source 12, while a cathode of the diode 13 is connected to the transmission line L1 through the resistor 11. Therefore, the positive DC voltage Vdc of the DC power source 12 is applied to a pair of transmission lines L1 and L2 through the diode 13 and the resistor 11, so that a facsimile signal can be transmitted so as to be superimposed on the DC voltage by way of a pair of transmission lines L1 and L2, in a manner similar to that of the first preferred embodiment. Furthermore, the above-mentioned arrangement has such an advantageous effect as the followings: even when a telephone line of the actual public switched telephone network is connected to, for example, the transmission lines L1 and L2 by an operator's mistake, a high voltage of about −48 V sent from the telephone line can be prevented from being applied to the DC power source 12 by the diode 13 so as to protect the DC power source 12. The other operations and advantageous effects of the second preferred embodiment are similar to those of the first preferred embodiment.

In the communication connection apparatus 10a of the second preferred embodiment shown in FIG. 2, the positive DC voltage Vdc is applied to the transmission line L1. However, the present invention is not limited to this, and a negative DC voltage may be applied to the transmission line L1. In such a case, the direction of the polarity of the diode 13 is reverse to the direction of the polarity thereof shown in FIG. 2.

Third Preferred Embodiment

Figure 3:
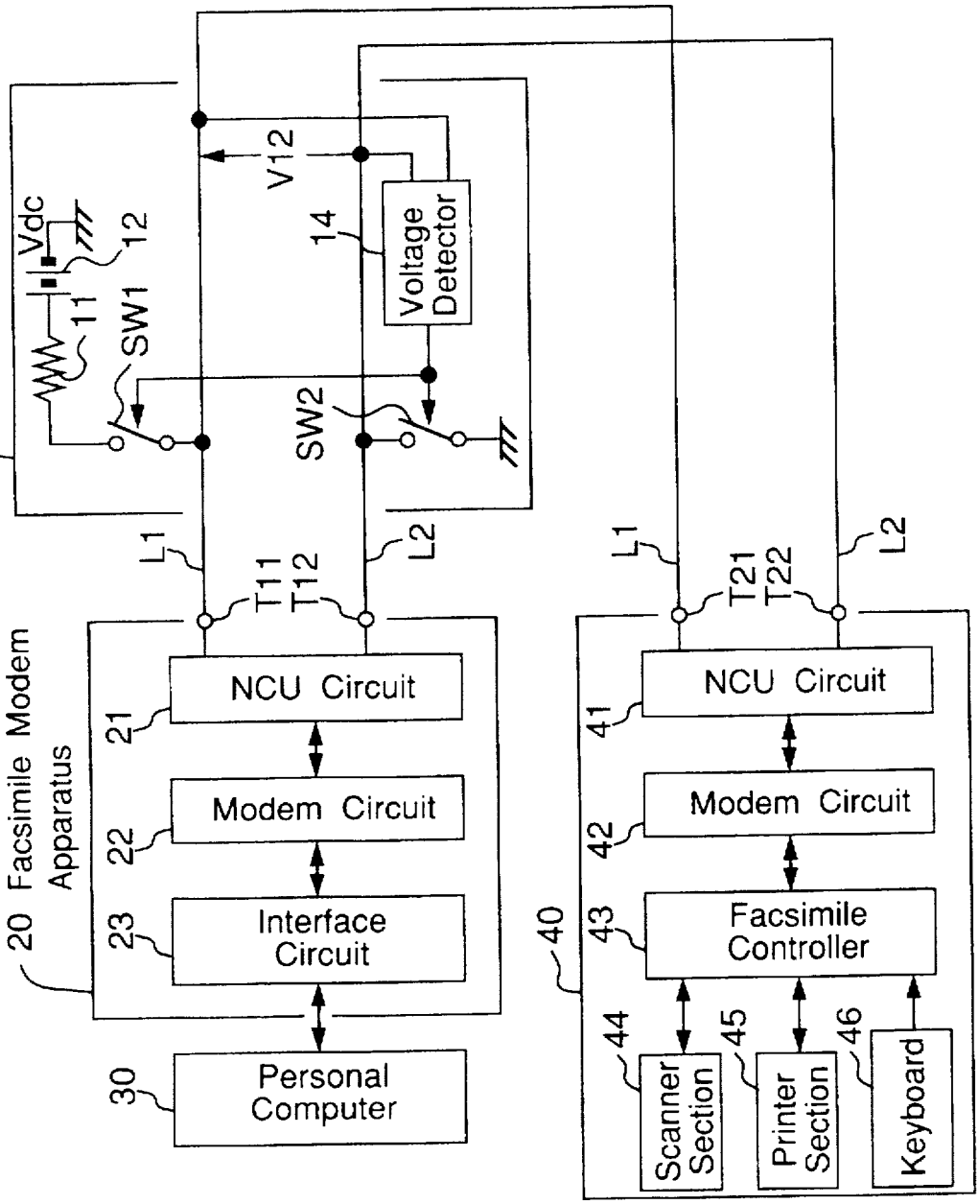
FIG. 3 is a block diagram of a communication system including a communication connection apparatus 10b according to a third preferred embodiment of the present invention.

FIG. 3 is a block diagram of a communication system including a communication connection apparatus 10b according to a third preferred embodiment of the present invention. In FIG. 3, the same components as those shown in FIGS. 1 and 2 are denoted by the same reference numerals shown in FIGS. 1 and 2.

As seen from comparison between the communication connection apparatuses 10 and 10b shown in FIGS. 1 and 3, the communication connection apparatus 10b of the third preferred embodiment is characterized in further comprising:

(a) a switch SW1 having either an ON-state or OFF-state, which is connected between the transmission line L1 and the resistor 11, and which is normally or previously put in the ON-state thereof;

(b) a switch SW2 having either an ON-state or OFF-state, which is connected between the transmission line L2 and the ground, and which is normally or previously put in the ON-state thereof; and (c) a voltage detector 14 which detects a voltage V12 across a pair of transmission lines L1 and L2, and controls the switches SW1 and SW2 to be switched over from the ON-states to the OFF-states thereof when the detected voltage V12 is higher than a threshold voltage Vth that is slightly higher than the predetermined DC voltage Vdc.

Referring to FIG. 3, the positive DC voltage Vdc of the DC power source 12 is applied to the transmission line L1 through the resistor 11, which operates as a pull-up resistor, and the switch SW1. On the other hand, the transmission line L2 is grounded through the switch SW2. Then, the voltage detector 14 is constituted by a comparator, and operates to detect the voltage V12 across a pair of transmission lines L1 and L2, and controls the switches SW1 and SW2 to be switched over from the ON-states to the OFF-states thereof when the detected voltage is higher than the threshold voltage Vth that is slightly higher than the predetermined DC voltage Vdc. In the preferred embodiment, when the DC voltage Vdc is +5 V, the threshold voltage Vth is preferably set, for example, to +6 V.

In the communication connection apparatus 10b of the third preferred embodiment constructed as above, the positive DC voltage Vdc of the DC power source 12 is applied to a pair of transmission lines L1 and L2 through the resistor 11 and the switch SW1, so that a facsimile signal can be transmitted so as to be superimposed on the DC voltage by way of a pair of transmission lines L1 and L2, in a manner similar to that of the first preferred embodiment. Furthermore, even when a telephone line of the actual public switched telephone network is connected to, for example, the transmission lines L1 and L2 by an operator's mistake, the high voltage of about −48 V sent from the telephone line is detected by the voltage detector 14, so that the switches SW1 and SW2 are put in the OFF-state thereof, and then, the DC power source 12 is disconnected from the transmission lines L1 and L2. Therefore, the above-mentioned arrangement of the third preferred embodiment has such an advantageous effect that the high voltage is prevented from being applied to the DC power source 12 so as to protect the DC power source 12. The other operations and advantageous effects of the third preferred embodiment are similar to those of the first preferred embodiment.

The third preferred embodiment is provided with the switches SW1 and SW2. However, the present invention is not limited to this, and only the switch SW1 may be provided.

Fourth Preferred Embodiment

Figure 4:
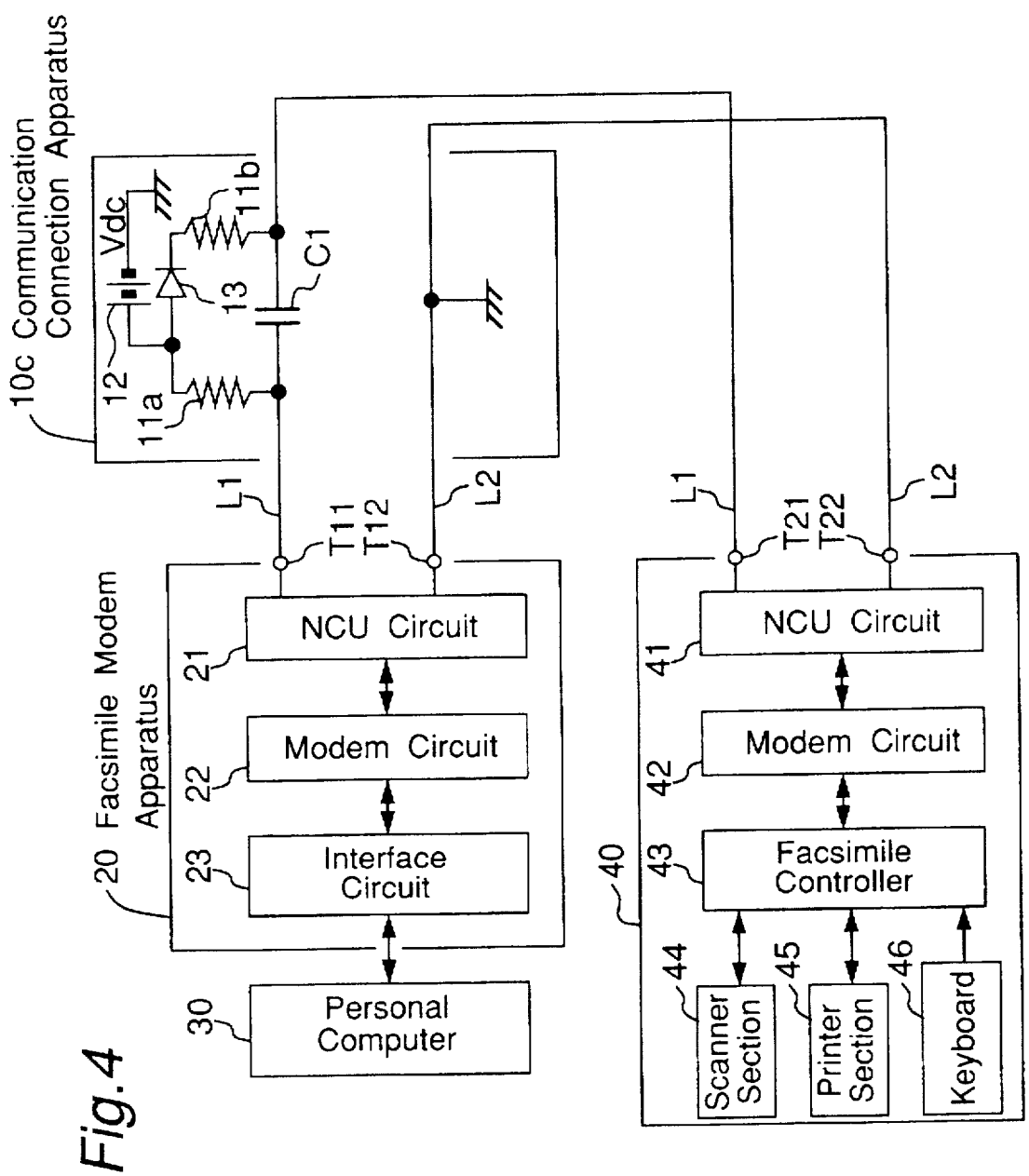
FIG. 4 is a block diagram of a communication system including a communication connection apparatus 10c according to a fourth preferred embodiment of the present invention.

FIG. 4 is a block diagram of a communication system including a communication connection apparatus 10c according to a fourth preferred embodiment of the present invention. In FIG. 4, the same components as those shown in FIGS. 1 to 3 are denoted by the same reference numerals shown in FIGS. 1 to 3. The communication connection apparatus 10c of the fourth preferred embodiment is, as shown in FIG. 4, characterized in comprising:

(a) a capacitor C1 which is inserted on the way of the transmission line L1 and which operates to interrupt a DC current but allow an analog facsimile signal to be transmitted from the facsimile modem apparatus 20 or the facsimile apparatus 40 to be passed therethrough; and (b) a DC power source 12 which applies to one end of the capacitor C1 connected to the facsimile modem apparatus 20 through a resistor 11a, a predetermined DC voltage Vdc for transmitting the analog facsimile signal so as to superimpose the analog facsimile signal thereon by way of a pair of transmission lines L1 and L2, and which applies the predetermined DC voltage Vdc through a diode 13 and a resistor 11b to another end of the capacitor C1 connected to the facsimile apparatus 40.

Referring to FIG. 4, the capacitor C1 for interrupting the DC current but allowing the analog facsimile signal to be transmitted from the facsimile modem apparatus 20 or the facsimile apparatus 40 to be passed therethrough is inserted so as to be connected to the transmission line L1. The transmission line L2 is grounded. Further, the positive electrode of the DC power source 12 is connected through the resistor 11a to the one end of the capacitor C1 connected to the terminal T11 of the facsimile modem apparatus 20, while a connecting point of the positive electrode of the DC power source 12 and the resistor 11a is connected to the anode of the diode 13. The cathode of the diode 13 is connected through the resistor 11b to another end of the capacitor C1 connected to the terminal T21 of the facsimile apparatus 40. In this case, each of the resistors 11a and 11b preferably has a resistance value of 50 Ω to 100 Ω. Further, the capacitor C1 preferably has an electrostatic capacitance value of 0.1 µF.

In the communication system of the fourth preferred embodiment constructed as above, the facsimile apparatus 40 and the facsimile modem apparatus 20 are separated from each other by the capacitor C1 in terms of direct current. Therefore, when, for example, a telephone line of the public switched telephone network is connected to the facsimile apparatus 40, the high voltage of −48 V sent from the telephone exchange unit of the public switched telephone network is applied neither to the facsimile modem apparatus 20 nor to the DC power source 12 even though the communication connection apparatus 10c is kept connected. Furthermore, the DC power source 12 exerts no influence on the public switched telephone network. Therefore, in this state, the facsimile apparatus 40 can execute communication with the other facsimile apparatus or the other facsimile modem apparatus by way of the telephone line of the actual public switched telephone network.

Furthermore, in a manner similar to that of the first preferred embodiment, the predetermined DC voltage Vdc is applied from the DC power source 12 to a pair of transmission lines L1 and L2, through the resistor 11a and through the diode 13 and the resistor 11b. With the above-mentioned arrangement, the facsimile signal can be transmitted so as to be superimposed on the DC voltage by way of a pair of transmission lines L1 and L2. The communication connection apparatus 10 has such an advantageous effect that it has a very simple construction and it can be manufactured at a cost lower than that of the prior art.

Fifth Preferred Embodiment

Figure 5:
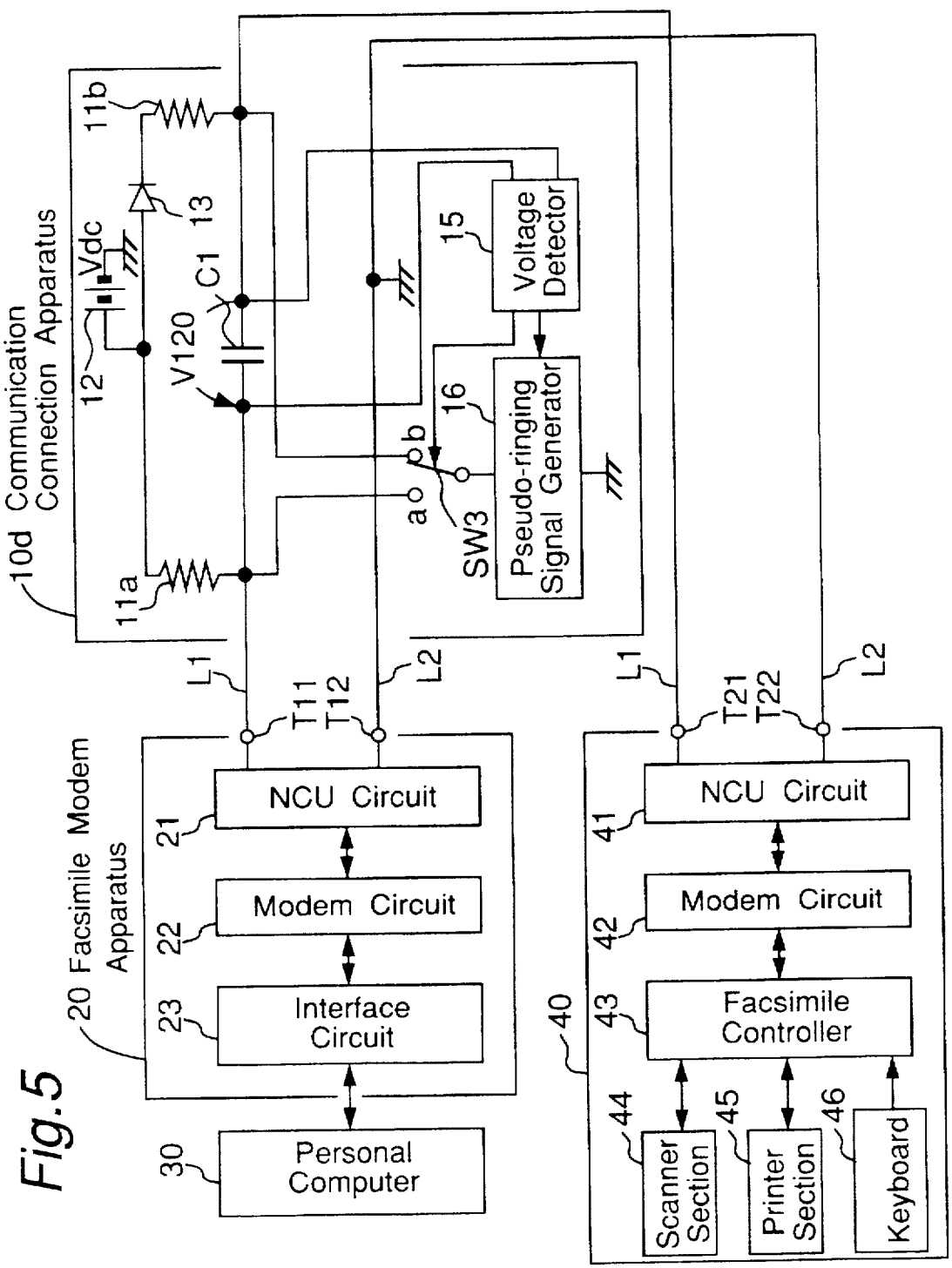
FIG. 5 is a block diagram of a communication system including a communication connection apparatus 10d according to a fifth preferred embodiment of the present invention.

FIG. 5 is a block diagram of a communication system including a communication connection apparatus 10d according to a fifth preferred embodiment of the present invention. In FIG. 5, the same components as those shown in FIGS. 1 to 4 are denoted by the same reference numerals shown in FIGS. 1 to 4.

Figure 7A:
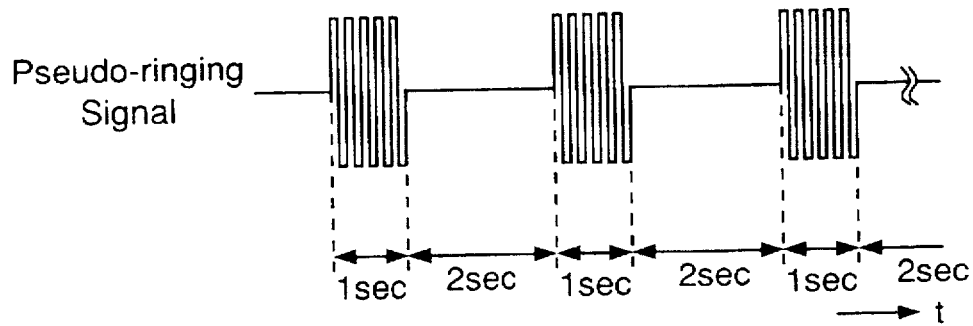
FIG. 7A is a timing chart showing a first pseudo ringing signal generated by a pseudo ringing signal generator circuit 16 shown in FIG. 5.

As seen from comparison between the communication connection apparatuses 10c and 10d of the fourth and fifth preferred embodiments, the communication connection apparatus 10d of the fifth preferred embodiment is characterized in further comprising:

(a) a pseudo ringing signal generator 16 for generating a pseudo ringing signal of the telephone line as shown in FIG. 7A; and (b) another voltage detector 15 which detects a voltage V120 across both the ends of the capacitor C1 and controls the detector 15 to control a switch SW3 to be switched to a contact point "a" thereof, and transmits the pseudo ringing signal from the pseudo ringing signal generator 16 to the facsimile modem apparatus 20 when the voltage of one end of the capacitor C1 connected to the terminal T11 is higher than the voltage of another end of the capacitor C1 connected to the terminal T21, and which switches over the switch SW3 to a contact point "b"thereof, and transmits the pseudo ringing signal from the pseudo ringing signal generator 16 to the facsimile apparatus 40 when the detected voltage of the one end of the capacitor C1 is lower than the voltage of another end of the capacitor C1. The point that the present apparatus 10d differs from the communication connection apparatus 10c of the fourth preferred embodiment shown in FIG. 4 will be described below.

Referring to FIG. 5, the pseudo ringing signal generator 16 generates a 16-Hz pseudo ringing signal of the telephone line as shown in FIG. 7A. The voltage detector 15 is constituted by a comparator, and detects the voltage V120 across both the ends of the capacitor C1 in the case where the voltage of the terminal T21 is set to a reference zero voltage.

When the facsimile apparatus 40 is desired to, for example, automatically receive an incoming call from the facsimile modem apparatus 20, a predetermined command for an automatic receiving of an incoming call is inputted using the keyboard 46, and then, the switch SW21 of the NCU circuit 41 of the facsimile apparatus 40 is turned on to be put in the off-hook state thereof. Upon this operation, the voltage of the terminal T21 becomes lower than the voltage of the terminal T11, and consequently the voltage V120 becomes a positive voltage. At that time, the voltage detector 15 detects the positive voltage V120, switches over the switch SW3 to the contact point "a" thereof, and transmits the pseudo ringing signal from the pseudo ringing signal generator 16 to the facsimile modem apparatus 20. In response to this, the ringing signal detector 26 of the NCU circuit 21 of the facsimile modem apparatus 20 detects the pseudo ringing signal, and informs the modem circuit 22 of the occurrence of an incoming call. Subsequently, according to a predetermined facsimile communication protocol between the facsimile apparatus 40 and the facsimile modem apparatus 20, facsimile communication for transmitting image data is executed from the facsimile apparatus 40 to the facsimile modem apparatus 20.

On the other hand, when the facsimile modem apparatus 20 is desired to automatically receive an incoming call from the facsimile apparatus 40, a predetermined command of automatic receiving of an incoming call is inputted using the keyboard (not shown) of the personal computer 30, the switch SW11 of the NCU circuit 21 of the facsimile modem apparatus 20 is turned on to be put in the off-hook state thereof. Upon this operation, the voltage of the terminal T11 becomes lower than the voltage of the terminal T21, and consequently the voltage V120 becomes a negative voltage.

At that time, the voltage detector 15 detects the negative voltage V120, switches over the switch SW3 to the contact point "b" thereof, and transmits the pseudo ringing signal from the pseudo ringing signal generator 16 to the facsimile apparatus 40. In response to this, the ringing signal detector 48 of the NCU circuit 41 of the facsimile apparatus 40 detects the pseudo ringing signal, and informs the modem circuit 42 of the occurrence of the incoming call. Subsequently, according to a predetermined facsimile communication protocol between the facsimile modem apparatus 20 and the facsimile apparatus 40, facsimile communication for transmitting image data is executed from the facsimile modem apparatus 20 to the facsimile apparatus 40.

The fifth preferred embodiment constructed as above is provided with the voltage detector 15 for detecting the voltage V120 across both the ends of the capacitor C1, and the pseudo ringing signal generator 16 for generating a pseudo ringing signal of the telephone line. Therefore, by putting the apparatus, which is desired to effect automatic receiving of incoming call, into the off-hook state thereof, the pseudo ringing signal can be transmitted to a further apparatus on the opposite side, thereby allowing a facsimile communication of automatic receiving of incoming call to be executed. The other operations and advantageous effects of the fifth preferred embodiment are similar to those of the fourth preferred embodiment.

Figure 7B:
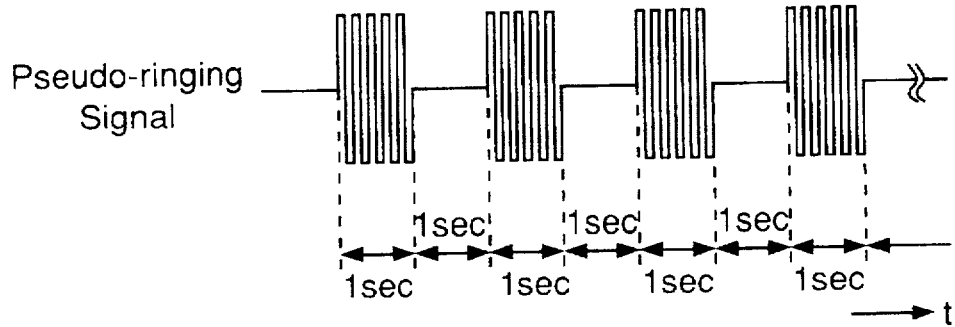
FIG. 7B is a timing chart showing a second pseudo ringing signal generated by the pseudo ringing signal generator circuit 16 shown in FIG. 5.
Figure 9:
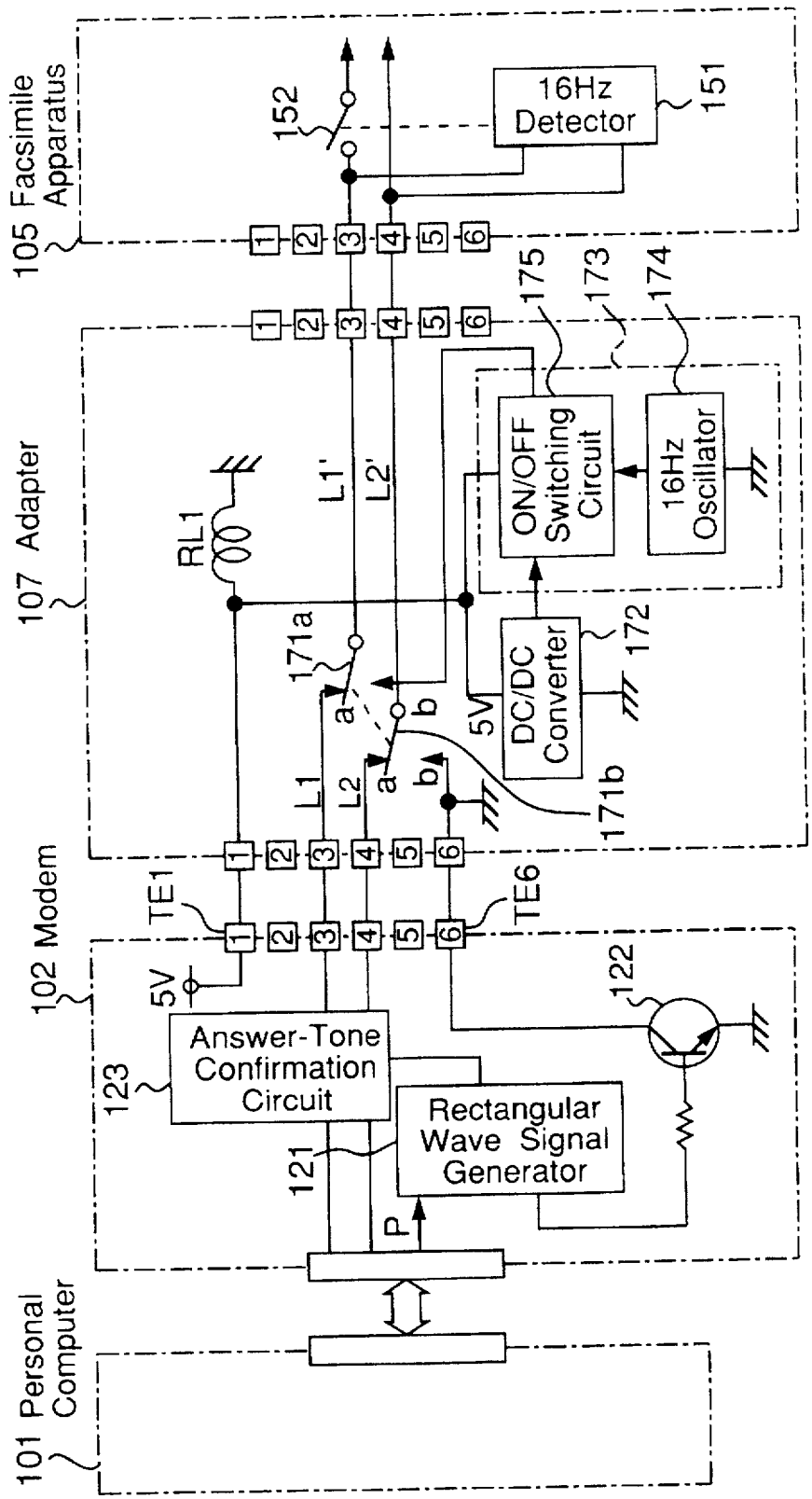
FIG. 9 is a block diagram of a communication system including a second prior art adapter.

In the fifth preferred embodiment as described above, the pseudo ringing signal generator 16 generates a pseudo ringing signal according to the timing chart shown in FIG. 7A. However, the present invention is not limited to this, and the pseudo ringing signal may be generated according to the timing chart shown in FIG. 7B.

Other preferred Embodiments

Figure 10:
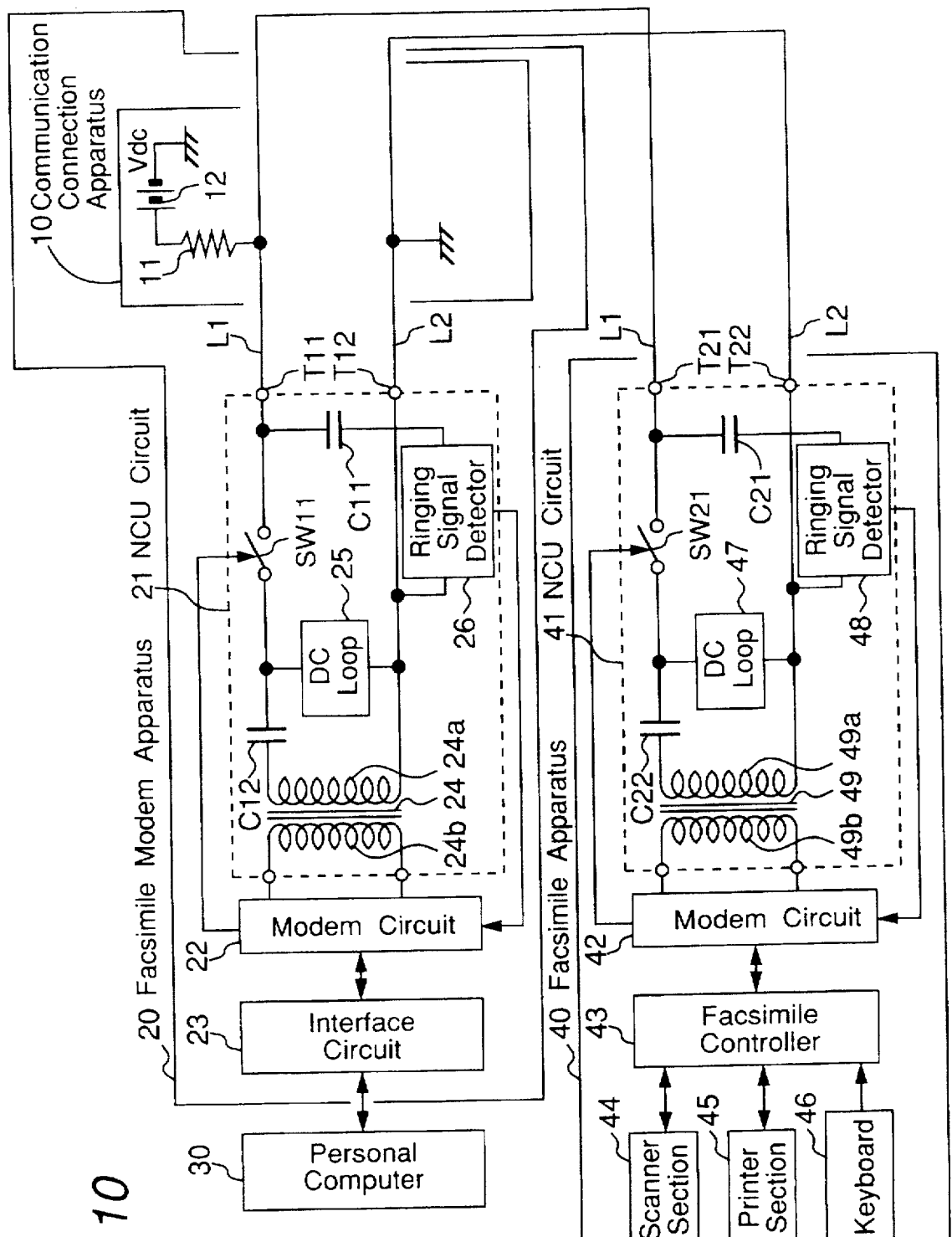
FIG. 10 is a block diagram of a communication system comprising the facsimile modem apparatus 20 including the communication connection apparatus 10 according to a modification of the first preferred embodiment shown in FIG. 1.

FIG. 10 is a block diagram of a communication system comprising the facsimile modem apparatus 20 including the communication connection apparatus 10 according to a modification of the first preferred embodiment shown in FIG. 1. In the modification, the facsimile modem apparatus 20 may include the communication connection apparatus 10, and then, the DC voltage Vdc may be supplied from the facsimile modem apparatus 20 to a pair of transmission lines L1 and L2.

Figure 11:
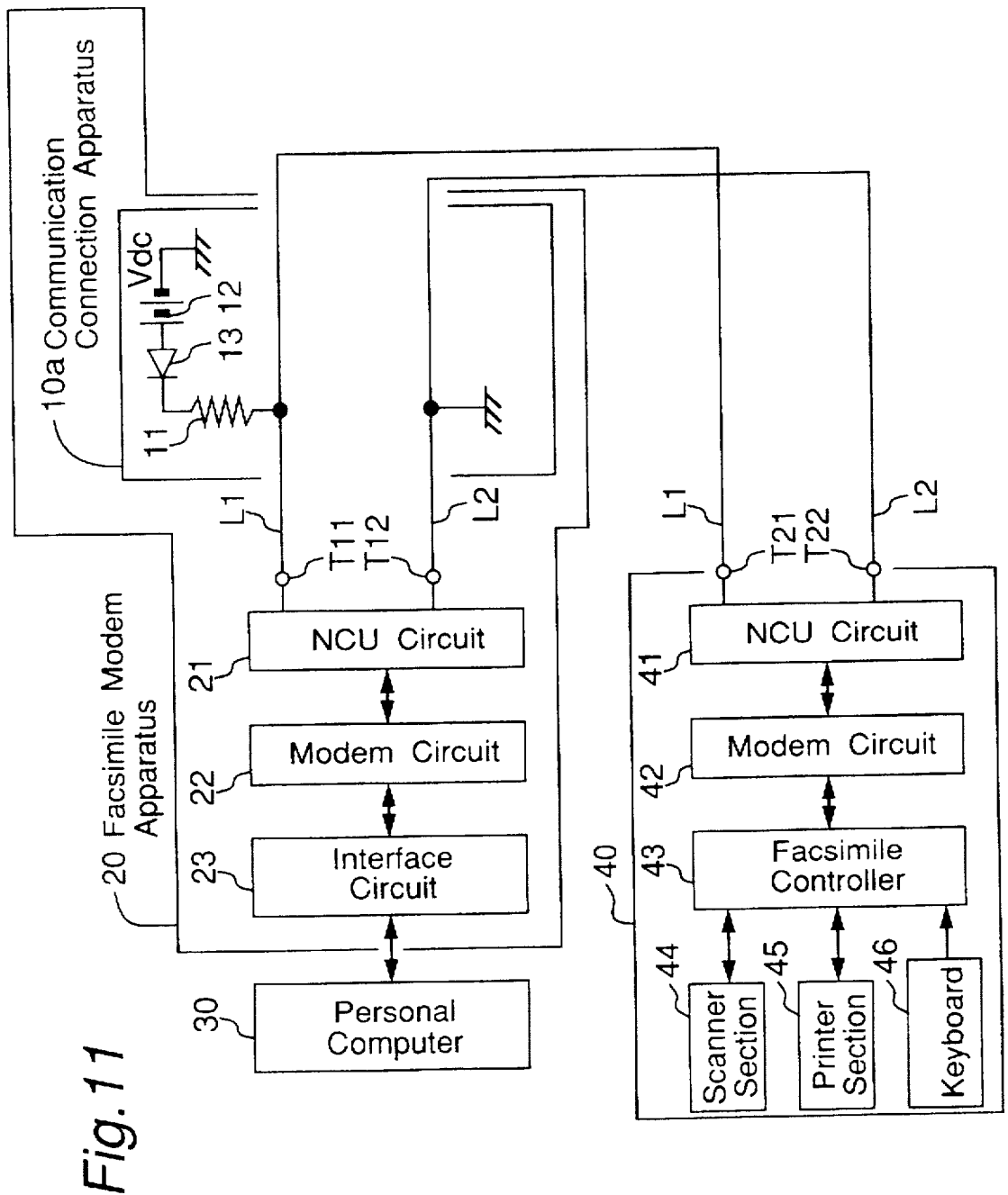
FIG. 11 is a block diagram of a communication system comprising the facsimile modem apparatus 20 including the communication connection apparatus 10a according to a modification of the second preferred embodiment shown in FIG. 2.

FIG. 11 is a block diagram of a communication system comprising the facsimile modem apparatus 20 including the communication connection apparatus 10a according to a modification of the second preferred embodiment shown in FIG. 2. In the modification, the facsimile modem apparatus 20 may include the communication connection apparatus 10a, and then, the DC voltage Vdc may be supplied from the facsimile modem apparatus 20 to a pair of transmission lines L1 and L2.

Figure 12:
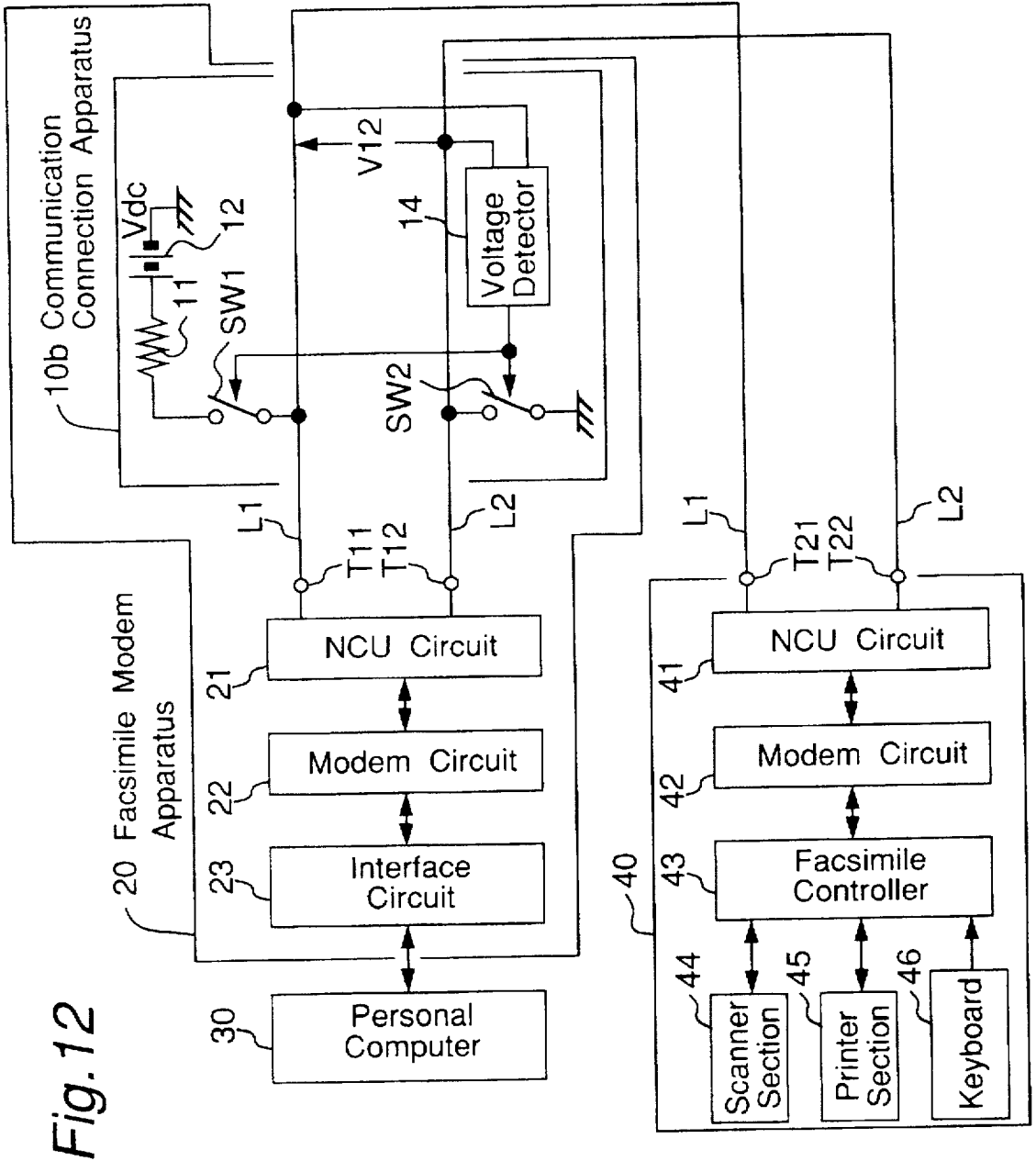
FIG. 12 is a block diagram of a communication system comprising the facsimile modem apparatus 20 including the communication connection apparatus 10b according to a modification of the third preferred embodiment shown in FIG. 3.

FIG. 12 is a block diagram of a communication system comprising the facsimile modem apparatus 20 including the communication connection apparatus 10b according to a modification of the third preferred embodiment shown in FIG. 3. In the modification, the facsimile modem apparatus 20 may include the communication connection apparatus 10b, and then, the DC voltage Vdc may be supplied from the facsimile modem apparatus 20 to a pair of transmission lines L1 and L2.

Figure 13:
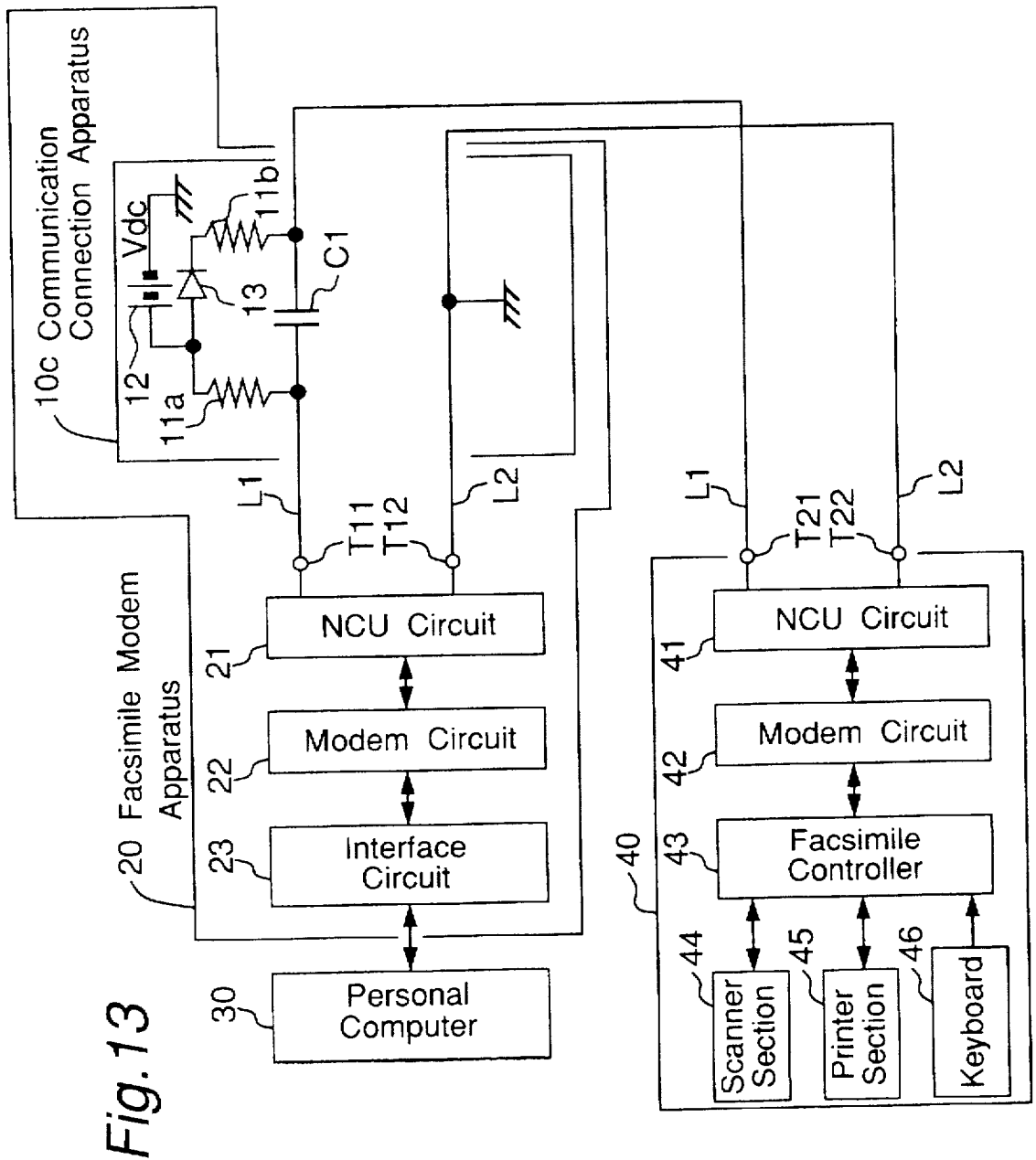
FIG. 13 is a block diagram of a communication system comprising the facsimile modem apparatus 20 including the communication connection apparatus 10c according to a modification of the fourth preferred embodiment shown in FIG. 4.

FIG. 13 is a block diagram of a communication system comprising the facsimile modem apparatus 20 including the communication connection apparatus 10c according to a modification of the fourth preferred embodiment shown in FIG. 4. In the modification, the facsimile modem apparatus 20 may include the communication connection apparatus 10c, and then, the DC voltage Vdc may be supplied from the facsimile modem apparatus 20 to a pair of transmission lines L1 and L2.

Figure 14:
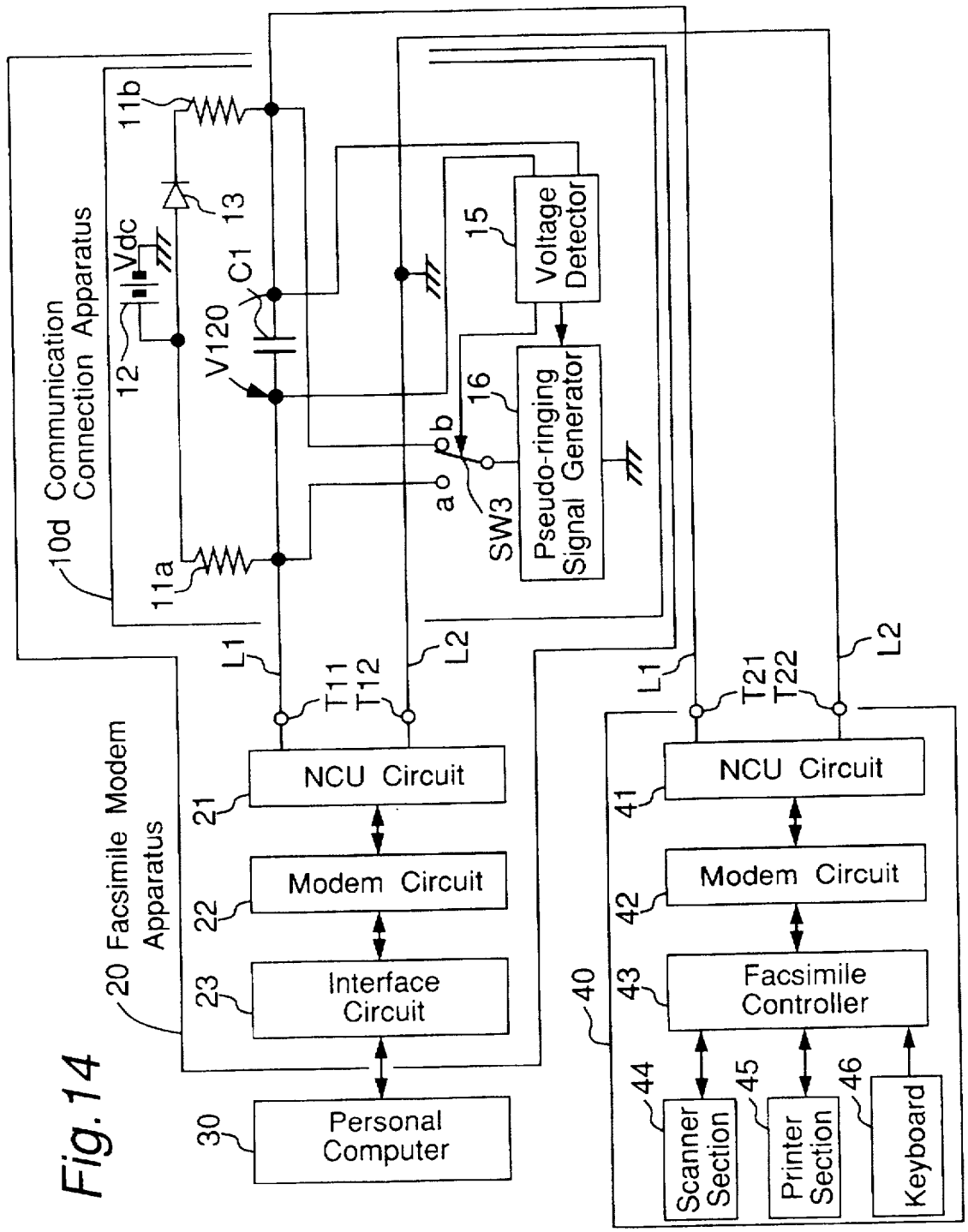
FIG. 14 is a block diagram of a communication system comprising the facsimile modem apparatus 20 including the communication connection apparatus 10d according to a modification of the fourth preferred embodiment shown in FIG. 5.

FIG. 14 is a block diagram of a communication system comprising the facsimile modem apparatus 20 including the communication connection apparatus 10d according to a modification of the fourth preferred embodiment shown in FIG. 5. In the modification, the facsimile modem apparatus 20 may include the communication connection apparatus 10d, and then, the DC voltage Vdc may be supplied from the facsimile modem apparatus 20 to a pair of transmission lines L1 and L2.

According to the communication connection apparatus of the first invention as described above, in a communication connection apparatus which is connected between a facsimile modem apparatus and a facsimile apparatus and which executes communication by connecting the facsimile modem apparatus with the facsimile apparatus by way of a pair of transmission lines, there is provided DC power source means for applying a predetermined DC voltage for transmitting an analog facsimile signal transmitted from the facsimile modem apparatus or the facsimile apparatus so as to superimpose the analog facsimile signal on the DC voltage by way of a pair of transmission lines to a pair of transmission lines through a resistor.

Accordingly, with the construction in which the predetermined DC voltage is applied from the DC power source means to a pair of transmission lines through the resistor, the facsimile signal can be transmitted so as to be superimposed on the DC voltage by way of a pair of transmission lines. The present communication connection apparatus has such an advantageous effect that it has a very simple construction and it can be manufactured at a cost lower than that of the prior art.

Further, the communication connection apparatus of the first invention is further provided with diode means connected between the DC power source means and the resistor in a direction of the polarity of the diode means such that the predetermined DC voltage is applied to a pair of transmission lines. With this arrangement, the predetermined DC voltage of the DC power source means is applied to a pair of transmission lines through the diode means and the resistor, thereby allowing the facsimile signal to be transmitted so as to be superimposed on the DC voltage by way of a pair of transmission lines. Furthermore, the above-mentioned arrangement has such an advantageous effect that, even when a telephone line of the actual public switched telephone network is connected to, for example, a pair of transmission lines by an operator's mistake, the high voltage of about −48 V sent from the telephone line can be prevented from being applied to the DC power source means by the diode 13 so as to protect the DC power source means.

Furthermore, the communication connection apparatus of the first invention is provided further with switch means which is connected between one transmission line of a pair of transmission lines and is normally or previously put in the ON-state thereof, and voltage detecting means which detects a voltage generated across a pair of transmission lines and controls switch means to be switched over from the ON-state to the OFF-state thereof when the detected voltage is higher than a predetermined threshold voltage higher than the predetermined DC voltage. With this arrangement, the predetermined DC voltage of the DC power source means is applied to a pair of transmission lines through the resistor and the switch means, thereby allowing the facsimile signal to be transmitted so as to be superimposed on the DC voltage by way of a pair of transmission lines. Furthermore, even when a telephone line of the actual public switched telephone network is connected to, for example, a pair of transmission lines by an operator's mistake, the high voltage of about −48 V sent from the telephone line is detected by the voltage detecting means, so that the switch means is put in the OFF-state thereof.

Therefore, the DC power source means is separated from a pair of transmission lines. Accordingly, the apparatus has such an advantageous effect that the high voltage can be prevented from being applied to the DC power source means so as to protect the DC power source means.

Furthermore, according to the communication connection apparatus of the second invention, in a communication connection apparatus which is connected between a facsimile modem apparatus and a facsimile apparatus and which executes communication by connecting the facsimile modem apparatus with the facsimile apparatus by way of a pair of transmission lines, there is provided a capacitor which is inserted in one of a pair of transmission lines and operates to interrupt a DC current and allow an analog facsimile signal transmitted from the facsimile modem apparatus or the facsimile apparatus to pass therethrough, and DC power source means for applying through a first resistor to one end of the capacitor connected to the facsimile modem apparatus, a predetermined DC voltage for transmitting the analog facsimile signal so as to superimpose the analog facsimile signal on the DC voltage by way of a pair of transmission lines, and applying the predetermined DC voltage through diode means and a second resistor to another end of the capacitor connected to the facsimile apparatus. The facsimile apparatus and the facsimile modem apparatus are separated from each other by the capacitor in terms of DC current.

Accordingly, when a telephone line of the actual public switched telephone network is connected to, for example, the facsimile apparatus, the high voltage of −48 V sent from the telephone exchange unit of the public switched telephone network is applied neither to the facsimile apparatus nor to the DC power source means even when the communication connection apparatus is kept connected. Furthermore, the DC power source means exerts no influence on the public switched telephone network.

Accordingly, the facsimile apparatus can execute communication with another facsimile apparatus or another facsimile modem apparatus by way of the telephone line of the actual public switched telephone network in this state.

Furthermore, in a manner similar to that of the communication connection apparatus of the first invention, the predetermined DC voltage is applied from the DC power source means to a pair of transmission lines through the first resistor and through the diode means and the second resistor. With this arrangement, the facsimile signal can be transmitted so as to be superimposed on the DC voltage, by way of a pair of transmission lines. The present communication connection apparatus has such an advantageous effect that it has a very simple construction and it can be manufactured at a cost lower than that of the prior art.

Furthermore, the communication connection apparatus of the second invention is provided further with signal generating means for generating a pseudo ringing signal of a telephone line, and further voltage detecting means which detects a voltage generated across both the ends of the capacitor, controls so that the pseudo ringing signal is transmitted from the signal generating means to the facsimile modem apparatus when the voltage of the one end of the capacitor is higher than the voltage of another end of the capacitor, and controls so that the pseudo ringing signal is transmitted from the signal generating means to the facsimile apparatus when the voltage of the one end of the capacitor is lower than the voltage of another end of the capacitor.

Accordingly, by putting the apparatus desired to effect automatic receiving of an incoming call into the off-hook state thereof, the pseudo ringing signal can be transmitted to the apparatus on the opposite side, thereby allowing facsimile communication to be executed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, comprising:

DC power source means connected only with a resistor in a series circuit path between said pair of transmission lines to apply a predetermined DC voltage thereto for transmitting an analog facsimile signal transmitted from either one of said facsimile modem apparatus and said facsimile apparatus so as to superimpose the analog facsimile signal on the DC voltage by way of said pair of transmission lines.

2. The communication connection apparatus as claimed in claim 1, further comprising:

diode means operatively connected in series with said DC power source means and said resistor in said series circuit path in a direction of a polarity of said diode means such that said predetermined DC voltage is applied to said pair of transmission lines.

3. A communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, comprising:

DC power source means for applying to said pair of transmission lines through a resistor, a predetermined DC voltage for transmitting an analog facsimile signal transmitted from either one of said facsimile modem apparatus and said facsimile apparatus so as to superimpose the analog facsimile signal on the DC voltage by way of said pair of transmission lines;

switch means having either one of an ON-state and an OFF-state, operatively connected between one transmission line of said pair of transmission lines, and said resistor, said switch means being normally or previously put in an ON-state thereof; and voltage detecting means for detecting a voltage generated across said pair of transmission lines and controlling said switch means to be switched over from the ON-state to an OFF-state thereof when the detected voltage is higher than a predetermined threshold voltage higher than said predetermined DC voltage.

4. A communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, comprising:

a capacitor operatively inserted in one of said pair of transmission lines, said capacitor interrupting a DC current and allowing an analog facsimile signal transmitted from either one of said facsimile modem apparatus and said facsimile apparatus to be passed therethrough; and DC power source means for applying through a first resistor to one end of said capacitor operatively connected to said facsimile modem apparatus, a predetermined DC voltage for transmitting said analog facsimile signal so as to superimpose the analog facsimile signal on the DC voltage by way of said pair of transmission lines and for applying said predetermined DC voltage through a diode means and a second resistor to another end of said capacitor operatively connected to said facsimile apparatus.

5. The communication connection apparatus as claimed in claim 4, further comprising:

signal generating means for generating a pseudo ringing signal of a telephone line; and further voltage detecting means for detecting a voltage generated across both the ends of said capacitor, controlling so that said pseudo ringing signal is transmitted from said signal generating means to said facsimile modem apparatus when a voltage of one end of said capacitor is higher than a voltage of another end of said capacitor, and controlling that said pseudo ringing signal is transmitted from said signal generating means to said facsimile apparatus when the voltage of one end of said capacitor is lower than the voltage of another end of said capacitor.

6. A facsimile modem apparatus comprising a communication connection apparatus, operatively connected between said facsimile modem apparatus and a facsimile apparatus, for connecting said facsimile modem apparatus with said facsimile apparatus by way of a pair of transmission lines so as to execute communication between said facsimile modem apparatus and said facsimile apparatus, said communication connection apparatus comprising:

DC power source means connected only with a resistor in a series circuit path between said pair of transmission lines to apply a predetermined DC voltage thereto for transmitting an analog facsimile signal transmitted from either one of said facsimile modem apparatus and said facsimile apparatus so as to superimpose the analog facsimile signal on the DC voltage by way of said pair of transmission lines.

7. The facsimile modem apparatus as claimed in claim 6, wherein said communication connection apparatus further comprises:

diode means operatively connected in series with said DC power source means in said resistor in said series circuit path in a direction of a polarity of said diode means such that said predetermined DC voltage is applied to said pair of transmission lines.

8. A facsimile modem apparatus comprising a communication connection apparatus, operatively connected between said facsimile modem apparatus and a facsimile apparatus, for connecting said facsimile modem apparatus with said facsimile apparatus by way of a pair of transmission lines so as to execute communication between said facsimile modem apparatus and said facsimile apparatus, said communication connection apparatus comprising:

DC power source means for applying to said pair of transmission lines through a resistor, a predetermined DC voltage for transmitting an analog facsimile signal transmitted from either one of said facsimile modem apparatus and said facsimile apparatus so as to superimpose the analog facsimile signal on the DC voltage by way of said pair of transmission lines;

switch means having either one of an ON-state and an OFF-state, operatively connected between one transmission line of said pair of transmission lines, and said resistor, said switch means being normally or previously put in an ON-state thereof; and voltage detecting means for detecting a voltage generated across said pair of transmission lines and controlling said switch means to be switched over from the ON-state to an OFF-state thereof when the detected voltage is higher than a predetermined threshold voltage higher than said predetermined DC voltage.

9. A facsimile modem apparatus comprising a communication connection apparatus, operatively connected between a facsimile modem apparatus and a facsimile apparatus, for connecting said facsimile modem apparatus with said facsimile apparatus by way of a pair of transmission lines so as to execute communication between said facsimile modem apparatus and said facsimile apparatus, said communication connection apparatus comprising:

a capacitor operatively inserted in one of said pair of transmission lines, said capacitor interrupting a DC current and allowing an analog facsimile signal transmitted from either one of said facsimile modem apparatus and said facsimile apparatus to be passed therethrough; and DC power source means for applying through a first resistor to one end of said capacitor operatively connected to said facsimile modem apparatus, a predetermined DC voltage for transmitting said analog facsimile signal so as to superimpose the analog facsimile signal on the DC voltage by way of said pair of transmission lines and for applying said predetermined DC voltage through a diode means and a second resistor to another end of said capacitor operatively connected to said facsimile apparatus.

10. The facsimile modem apparatus as claimed in claim 9, wherein said communication connection apparatus further comprises:

signal generating means for generating a pseudo ringing signal of a telephone line; and further voltage detecting means for detecting a voltage generated across both the ends of said capacitor, controlling so that said pseudo ringing signal is transmitted from said signal generating means to said facsimile modem apparatus when a voltage of one end of said capacitor is higher than a voltage of another end of said capacitor, and controlling that said pseudo ringing signal is transmitted from said signal generating means to said facsimile apparatus when the voltage of one end of said capacitor is lower than the voltage of another end of said capacitor.

\* \* \* \* \*